Dec. 9, 1969  W. B. KENNEDY ET AL  3,483,070
METHOD OF SANDING HONEYCOMB STRUCTURE AND THE SANDED ARTICLE
Filed Aug. 14, 1968  2 Sheets-Sheet 1
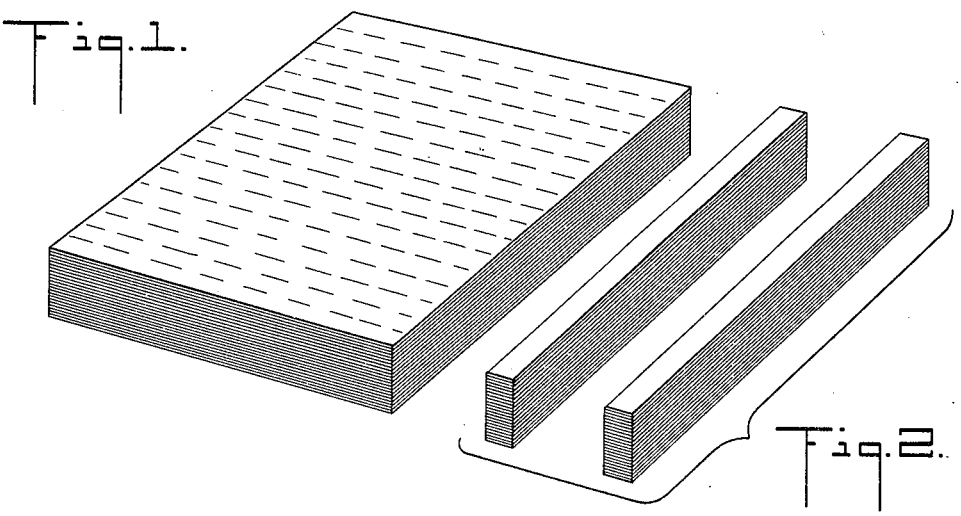
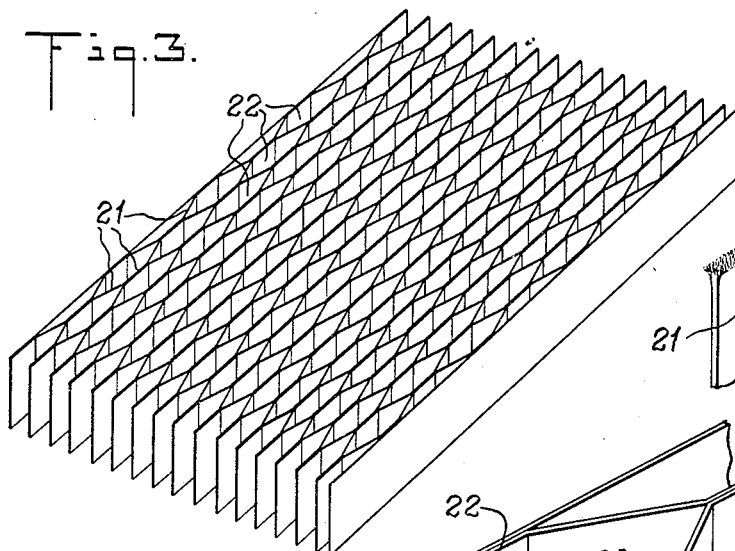
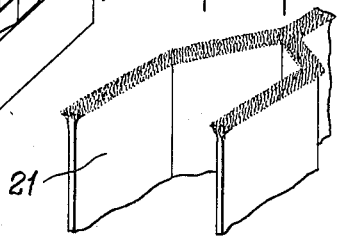
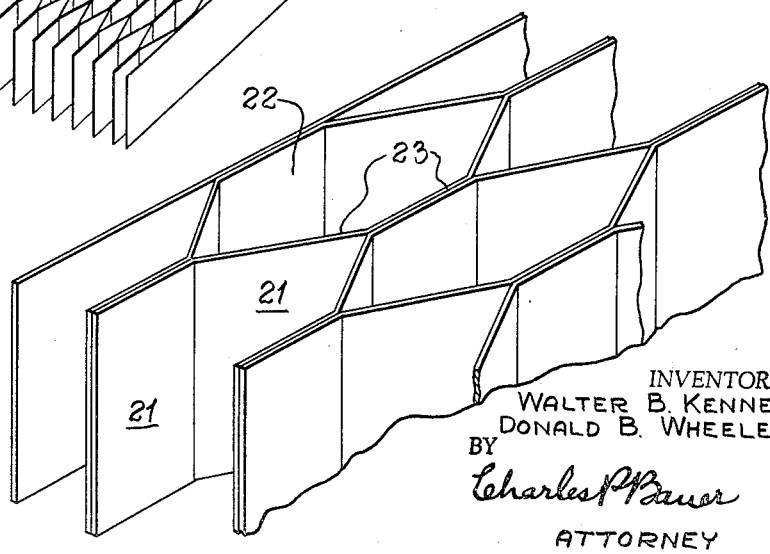
INVENTORS
WALTER B. KENNEDY
DONALD B. WHEELER
BY
Charles P Bauer
ATTORNEY Dec. 9, 1969  W. B. KENNEDY ET AL  3,483,070
METHOD OF SANDING HONEYCOMB STRUCTURE AND THE SANDED ARTICLE
Filed Aug. 14, 1968  2 Sheets-Sheet 2
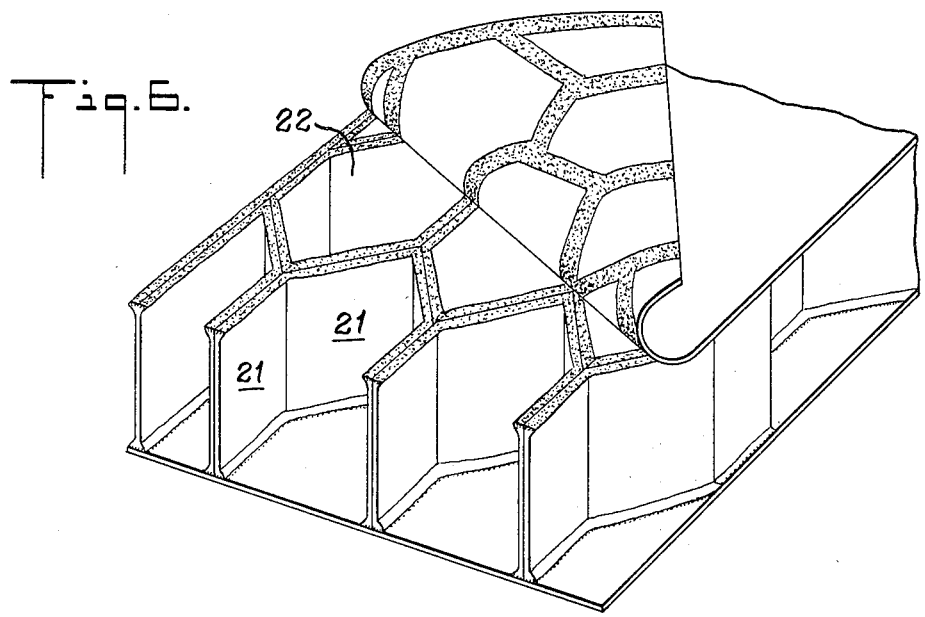
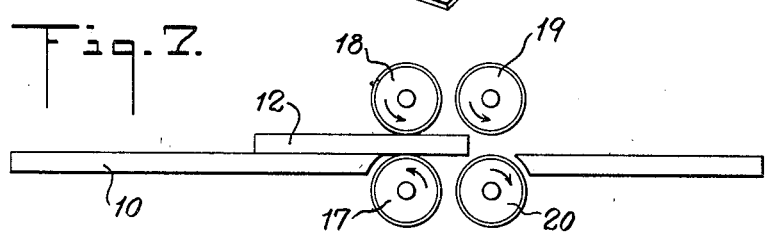
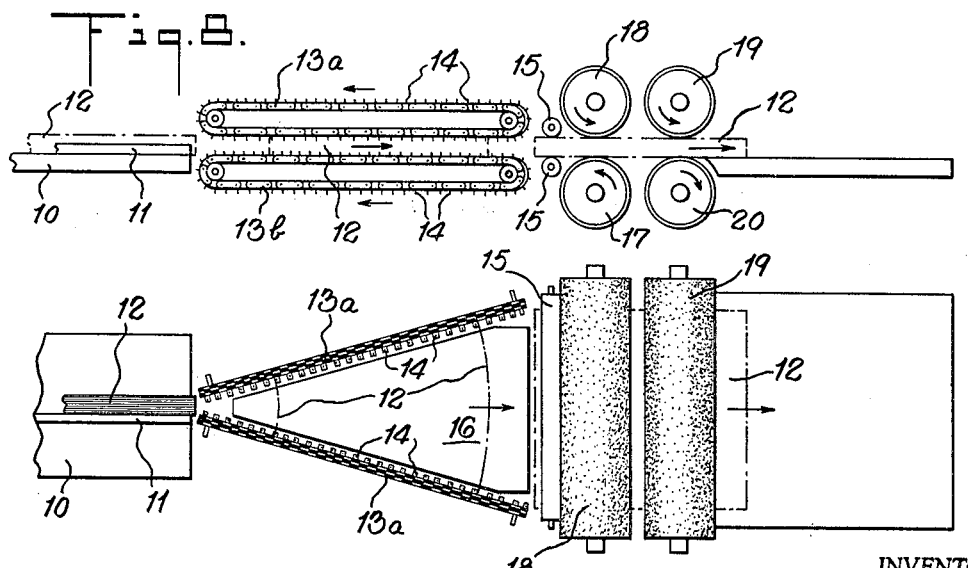
INVENTORS
WALTER B. KENNEDY
DONALD B. WHEELER
BY
Charles P Bauer
ATTORNEY

3,483,070
METHOD OF SANDING HONEYCOMB STRUCTURE AND THE SANDED ARTICLE
Walter B. Kennedy, Glens Falls, and Donald B. Wheeler, Hudson Falls, N.Y., assignors to Union Camp Corporation, New York, N.Y., a corporation of Virginia
Continuation-in-part of application Ser. No. 453,791, May 6, 1965. This application Aug. 14, 1968, Ser. No. 756,722
Int. Cl. B32b *3/12, 31/18;* B31d *3/02*
U.S. Cl. 161—68                                    3 Claims

ABSTRACT OF THE DISCLOSURE

A honeycomb structure is formed by bonding an open cellular structure to face sheets. To increase the bonding areas of the cellular structure, the edge portions of the sheets forming the walls of the cells are sanded to fray and unmat the edges in fibrous form and thereby form a contiguous mass of separated fibers which present a broader area for bonding contact. The frayed edges of the fibrous walls unmatted by sanding extend beyond the thickness of the sheets and flare out on each side of the wall to give the wall an I-beam cross section. To fray the fibers, the honeycomb is expanded sufficiently to provide a space for the formation of the I-beam frayed edge portions by sanding in the direction of the walls of the core. The bonding areas of the wall are increased three or four times in comparison with the unsanded core. By this technique, a substantial improvement in bonding strength between the so-frayed cell wall and the adhesively secured facing is achieved.

---

The present invention relates to improvements in honeycomb material. More particularly it pertains to a new and improved honeycomb cellular structure in which the edges of the cells are fibrous and flared out to create an I-beam form for the cell walls, and the method of producing such structure.

This application is a continuation-in-part of our copending application Ser. No. 453,791, filed May 6, 1965, and now abandoned for "Method of Abrading Honeycomb Structure and Article Produced."

The "honeycomb structure" or "honeycomb material," referred to in the specification and claims and shown in the drawing, is made up of a plurality of open-ended cells which may be of any desired size and shape, for example hexagonal, circular, oval or rectangular. Such structure may be formed of any desired material, for example, paper, cloth, metal, plastic or the like. The method of the present invention is primarily adapted for use on a paper honeycomb structure with the cells having a substantially hexagonal shape, but such method can also be adapted to a honeycomb structure of other size and shape. The paper honeycomb structure may be produced by superimposing sheets of paper upon each other until a thick stack is formed (FIGURE 1), each sheet of this stack being held to the one above it, by adhesive or other means, along spaced and generally parallel lines with the lines on one side of each sheet between the lines on the other side of such sheet. It will be seen that the distance between such lines determines the cell size. By cutting this stack across the lines holding the sheets together, pieces or packs (FIGURE 2) may be obtained of a cell length corresponding to the desired thickness of the honeycomb structure. Such pieces or packs may then be expanded into the desired shape and form. Thereafter, facing sheets are applied by adhesive to one or both sides of the expanded core. It is an object of the present invention to open the pieces or packs slightly and to sand the edges in the lengthwise direction of the sheets, thereby producing a honeycomb structure in which the cell walls are of I-beam shape with the edges of the walls fibrous and flared out to increase the bonding areas for the facing sheets.

A further object is to provide a method which not only creates a flange by flaring out the edges of the cell walls but also serves to size the thickness or caliper of the honeycomb structure to extreme accuracy and levels off the surface of the structure across the entire width and length.

A further object is to provide a method of the type described well suited to operate economically and in a practical and efficient manner.

A further object is to provide a honeycomb structure of the character stated which is simple in design but has a bonding area three or four times that found in a structure which has not been sanded as herein described.

It is a further object of the invention to provide a broader area and surface on the cell edge of the core to receive the adhesive which will bond the cell edge to a facing sheet. Since it is more economical to apply adhesive to the core rather than to the facing sheet, there has always been a problem of having enough area on the very edge of the cell wall so that the applied adhesive will stay on such edge. This is particularly true where the adhesive is applied on the top of the core where there is a tendency to run away from the bonding surface. The present invention accomplishes this and definitely increases the bond of the cell wall to the facing sheet.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which:

FIGURE 1 is a perspective view of a stack of sheets held together along spaced and generally parallel adhesive lines;

FIGURE 2 illustrates unexpanded honeycomb packs, which have been cut from the stack of FIGURE 1;

FIGURE 3 illustrates one of the honeycomb packs of FIGURE 2 turned on its side and partially expanded to show the cells;

FIGURE 4 illustrates an enlarged view of a portion of the pack of FIGURE 3;

FIGURE 5 shows the edges of the cell walls after they have been sanded and flared out;

FIGURE 6 shows an enlarged view of the expanded cellular structure with the edges sanded and flared out and with a facing sheet bonded to each side of the structure;

FIGURE 7 schematically shows in side elevation sanding apparatus for performing the method of the present invention;

FIGURE 8 shows the sanding apparatus of FIGURE 7 with a device for uniformly expanding the pack prior to sanding;

FIGURE 9 shows a top view of the sanding apparatus and expanding device of FIGURE 8.

There has always been the problem of making a strong bond in applying and adhesively affixing facing sheets to expanded honeycomb core. Such problem varies with the facing sheets, the thickness and type of cellular core, and the adhesive being used. Varied solutions have been tried in an effort to overcome the problem. The core both expanded and unexpanded has been sanded or abraded (Patent No. 2,581,421) in a direction at right angles to the walls of the core, which operation gives a relatively smooth cut with some fraying and little flare. Sanding at right angles to the walls requires extremely wide sanding rolls whereas the method of the present invention can be accomplished with a sander of narrow width. The pieces or packs have also been cut from the stack by a bandsaw, not only to make the cut but in an effort to create fraying. However, this has not been successful to form wider flared edges for the cell walls. In making panel structures the edges of the core have been rolled (Patent No. 2,719,809) but the edge is laid to one side or the other and the result has not been too satisfactory. In addition tabs have been cut in the edges of the walls (Patent No. 3,137,604) but they have not been successful because of the difficulty in making cuts of the proper depth without weakening the walls and because it is virtually imposisble to turn adjacent tabs in opposite directions to form a satisfactory and uniform bonding edge.

The method of the present invention comprises opening the cells of the core just enough to prevent the walls of the cells from buckling or laying over and to permit space between the wall edges for the resultant flaring out of the edges (FIGURE 3). With the core so opened it is fed into top and bottom sanding rolls in the direction of the walls of the core. Such sanding causes a roughening and flaring out of the fibers in the wall edges and creates an I-beam form in the walls. The fibers of the portion of the sheets along their edges are separated or unmatted and expanded on both sides of the edge to form a contiguous mass of separated fibers which occupies a wider space than formerly due to the flaring out of the edge at both sides of the sheet. Thus, the portion is expanded or enlarged to extend beyond the thickness of the sheets, as shown in FIGURES 5 and 6. The bonding areas of the wall areas are increased some three to four times over the unsanded core.

Referring more particularly to FIGURES 8 and 9, apparatus is shown schematically for sanding the honeycomb pack. Such apparatus is made up of a table 10 on which is a guide 11 for directing the pack 12 into the machine. To expand such pack uniformly there are pairs of upper and lower diverging chains 13a and 13b with pins 14 secured thereto. As the pack is fed into the chains, the pins 14 grip the pack on each side both top and bottom. The movement of the chains in a diverging direction pulls the pack apart before it is directed between the upper and lower gripping rolls 15. These serve to keep the pack in expanded condition just before entering the first sanding unit. To prevent sagging of the pack between the chains a support or table 16 may be used. FIGURE 7 shows simplified apparatus which omits the automatic expanding device. In such case the operator expands the core slightly and feeds it into the sanding rolls hereinafter described. The sanding units of the apparatus of FIGURE 7 are the same in all respects as those of FIGURE 8.

The first sanding unit is made up of a sanding roll 17 and a feed roll 18. These are spaced apart to the desired caliper or thickness of the pack. The sanding roll 17 has a grit surface adapted to give the desired unmatting or separation of fibers and to flare the fibrous mass. The feed roll 18 likewise has a grit surface and may be the same as the sanding roll. The feed roll 18 is driven at slow speed to hold the pack without abrading it, whereas the sanding roll 17 is driven at high speed to fray and flare or unmat the edges of the pack. As shown, both rolls run in a counterclockwise direction since this has been found most satisfactory for all types of honeycomb core. However, in core where the cells are not too large and the walls are not flimsy the sanding roll may be run in a clockwise direction as long as the feed roll holds back the pack to permit the sanding roll to perform its abrading action. The first sanding unit, as shown in FIGURES 7 and 8, sands the bottom edges of the honeycomb pack.

From the first sanding unit the pack proceeds to a second sanding unit which performs the same operation on the top edges of the pack. This unit is likewise made up of a sanding roll 19 and a feed roll 20, which can be the same as those of the first unit. The feed roll 20 runs in a clockwise direction whereas the sanding roll 19 runs in a counterclockwise direction. Here again, as stated above, the sanding roll can be run in a clockwise direction but this would tend to increase the resistance against the movement of the pack, slow the clearing of the pack from the machine, and prevent some grades of honeycomb from feeding through the machine properly.

Whether fed into the apparatus by hand as is shown in FIGURE 7 or automatically as is shown in FIGURE 8, the cells of the core are opened slightly so that sufficient space is allowed between the wall edges for the flaring out of the edges when the core is sanded as herein described. However, the cells of the core should not be over-expanded in which case the walls of the cells may buckle or lay over thus preventing the edges from making proper contact with the sanding rolls and leaving such edges with little or no fraying and flaring. FIGURE 3 illustrates the slight expansion of the core but it will be understood that the necessary expansion will vary dependent on the weight of the paper used in the walls 21 and the size of the cells 22.

It will be clearly understood that the edges of the cells are unmatted or separated to form a frayed and flared edge in I-beam form and that this is accomplished by a roughened or grit surface. Accordingly the term "sanding" is used herein to apply to "grinding" or "abrading."

Before the core is run through the sander it will be seen that the edges 23 of the walls are narrow and do not afford much bonding surface for the adhesive which is applied thereto for securing the facing sheets to the core (FIGURE 4). In contrast after the core has been sanded the edges of the cells are fibrous and flared out so that the walls assume an I-beam form (FIGURES 5 and 6). Thus the bonding surface has been increased three or four times that found in the unsanded core.

The operation of the invention will be apparent from the foregoing description. Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

Having described our invention, what we claim as new and desire to secure by Letters Patent is:

1. A honeycomb cellular structure comprising a stack of superimposed paper sheets, each sheet of said stack being bonded to the sheet above it by adhesive which is striped along uniformly spaced-apart parallel lines, the lines on one side of each sheet being staggered between the lines on the other side thereof, the sheets forming walls of open-ended cells when the outer sheets of the stack are expanded to set up the honeycomb, the cell size of the honeycomb being determined by the distance between the lines of adhesive and the cell length being determined by the width of the stack, the edges of each sheet on one side of said honeycomb being sanded, flared and frayed along the length of the sheets with the cells of the honeycomb being opened only slightly to permit sufficient space between the wall edges, which broadens the edge surface to about 3 or 4 times greater than the edge of said sheet before sanding and provides a generally one-half of an I-shaped cross section which increases the edge area on both sides of the edge for bonding to a facing sheet.

2. A method for expanding the edge portions of the paper sheets forming the walls of open-ended cells of a honeycomb structure made of a stack of superimposed paper sheets, each sheet bonded to the sheet above it by striped adhesive along uniformly spaced-apart parallel lines with the lines on one side of the sheet being staggered between the lines on the other side of the sheet to form walls and open-ended cells when the outer sheets of the stack are expanded, the method comprising the steps of opening the cells of the compressed stack only slightly so that sufficient space is permitted between the wall edges for flaring out the paper fibers at the edges while limiting said opening to prevent buckling under the pressure of sanding, grinding or abrading, and thereafter sanding all of the edges on one side of the honeycomb structure simultaneously in the lengthwise direction of the sheets to unmat and flare the fibers on both sides at said edges to give a generally half of an I-shaped cross section with an enlarged contact bonding surface of the edge about 3 to 4 times greater than the edge of the unsanded sheet.

3. A method as claimed in claim 2 wherein the sanding is carried out by passing the honeycomb through a pair of abrading rolls in which one roll rotates faster than the other roll to unmat and flare the fibers at the edges of the side of the honeycomb with which it is in contact.

References Cited

UNITED STATES PATENTS

| | | | |
|---|---|---|---|
| 2,581,421 | 1/1952 | Lombard et al. | 156—197 |
| 2,648,371 | 8/1953 | Goodwin et al. | 156—197 |
| 3,137,604 | 6/1964 | Bosch | 161—68 |
| 3,301,729 | 1/1967 | Kauffman | 156—197 X |

ROBERT F. BURNETT, Primary Examiner

R. L. MAY, Assistant Examiner

U.S. Cl. X.R.

156—154, 197

Dedication 3,483,070.—*Walter B. Kennedy*, Glens Falls and *Donald B. Wheeler*, Hudson Falls, N.Y. METHOD OF SANDING HONEYCOMB STRUCTURE AND THE SANDED ARTICLE. Patent dated Dec. 9, 1969. Dedication filed Dec. 20, 1972, by the assignee *Union Camp Corporation*.

Hereby dedicates to the Public the entire remaining portion of the term of said patent.

[*Official Gazette February 20, 1973.*]